(12) United States Patent
Scott (10) Patent No.: US 7,466,222 B2
(45) Date of Patent: Dec. 16, 2008

(54) ELEVATED MOTORCYCLE SIGNAL LIGHTS

(76) Inventor: Rudy L. Scott, 4309 Summerfield Dr., Piney Flats, TN (US) 37686

( * ) Notice: Subject to any disclaimer, the term of this patent is extended or adjusted under 35 U.S.C. 154(b) by 385 days.

(21) Appl. No.: 11/463,946

(22) Filed: Aug. 11, 2006

(65) Prior Publication Data

US 2007/0040665 A1   Feb. 22, 2007

Related U.S. Application Data

(60) Provisional application No. 60/708,482, filed on Aug. 17, 2005.

(51) Int. Cl.
*B60Q 1/26*   (2006.01)
(52) U.S. Cl. .................... 340/468; 340/478; 362/459
(58) Field of Classification Search .............. 340/468, 340/465, 475, 478, 432, 479; 362/459, 468, 362/465
See application file for complete search history.

(56) References Cited

U.S. PATENT DOCUMENTS

| | | | |
|---|---|---|---|
| 4,779,169 A | 10/1988 | Cruze | |
| 4,891,736 A | 1/1990 | Gouda | |
| 5,805,366 A | 9/1998 | McFarland | |
| 6,081,190 A | 6/2000 | Kellermann | |
| 6,152,587 A | 11/2000 | Berg | |
| 6,398,393 B1 | 6/2002 | Perse | |
| 6,406,168 B1 | 6/2002 | Whiting | |
| 6,686,837 B2 | 2/2004 | Kim | |
| D500,373 S | 12/2004 | Conte | |
| D501,571 S | 2/2005 | Kouchi et al. | |
| 6,998,970 B2 | 2/2006 | Conte | |
| 2003/0179087 A1 | 9/2003 | Stahel | |
| 2005/0185415 A1 | 8/2005 | Kouchi et al. | |

*Primary Examiner*—Jeffery Hofsass
*Assistant Examiner*—Hongmin Fan
(74) *Attorney, Agent, or Firm*—Knox Patents; Thomas A. Kulaga (57) ABSTRACT

An apparatus for providing visual signals at an elevated position on a motorcycle, including one or more of running lights, turn signals, and brake light. A pair of light assemblies each include a light bar, a stem, and a stem bracket. The light bar includes a plurality of amber lights on the front, the side, and the rear and a plurality of red lights on the rear. The lights are selectively controlled to provide visual signals to others. The stems connect light bars to the stem bracket. In one embodiment, the stem brackets are attached to the handlebars. In one such embodiment, the stem brackets are mounted in conjunction with the handlebar mounted mirrors.

20 Claims, 5 Drawing Sheets

ELEVATED MOTORCYCLE SIGNAL LIGHTS

CROSS-REFERENCE TO RELATED APPLICATIONS

This application claims the benefit of U.S. Provisional Application No. 60/708,482, filed Aug. 17, 2005.

STATEMENT REGARDING FEDERALLY SPONSORED RESEARCH OR DEVELOPMENT

Not Applicable

BACKGROUND OF THE INVENTION

1. Field of Invention

This invention pertains to signal lights for motorcycles. More particularly, this invention pertains to a pair of light assemblies that provide turn signal and brake signal indication. The light assemblies have an elevated position above the handlebars and near the extremities of the handlebars to facilitate viewing by other vehicles on the road without distracting the motorcycle operator.

2. Description of the Related Art

Vehicles operated on public roads are required to have signal lights, which include lights that signal brake actuation and left and right turn signals. Automobiles and trucks have signal lights that are readily seen by other vehicles because the vehicles are large and the lights are in standard, readily recognizable locations that are within the line-of-sight of others, such as operators of other vehicles and pedestrians. Motorcycles are handicapped because their physical size is smaller than other types of vehicles, particularly with the current popularity of trucks and sports utility vehicles. Another handicap for motorcycles is that they are narrow, which places the turn signal lights close to the centerline of the motorcycle, sometimes making it hard to distinguish one turn signal from another.

Various lighting schemes and devices are known. For example, motorcycles typically include a brake light on the rear fender at an elevation about even with the top of the rear tire. Also the typical motorcycle includes rear turn signals at about the same elevation as the brake light and front turn signals between the same elevation as the rear turn signals and the bottom of the handlebars. These standard lights provide signals directed toward the rear and the front of the motorcycle, but not the side.

Various attempts have been made to increase the visibility of motorcycles by providing additional or different signal lights. U.S. Pat. No. 6,398,393, titled "Illuminated folding foot peg," issued to Perse on Jun. 4, 2002, discloses a footpeg with forward and rearward facing signal lights. A disadvantage of the Perse device is that the lights are in the footpegs, which are necessarily positioned very near the ground and at a location well away from the normal line of sight of the operators of other vehicles sharing the road. Another disadvantage is that the rider's footgear often obstructs the illumination emitted by the footpeg lights.

There are examples of higher placed lights. U.S. Pat. No. 4,779,169, titled "Cycle hand grip with running light," issued to Cruze on Oct. 18, 1988, places running lights at the axial end of the handlebars and providing illumination directed to the side. U.S. Pat. No. 6,081,190, titled "Turn signal indicator assembly," issued to Kellermann on Jun. 27, 2000, places turn signal lights at the axial end of the handlebars and providing illumination directed to the front and rear, but not the side. The Kellermann patent discloses using an increased mass in order to dampen the effect of vibration on the turn signal indicator assembly.

United States Published Application 2003/0179087, titled "Mirror mounted turn signal light," by Stahel published on Sep. 25, 2003, discloses a strip of lights attached to a back surface of the motorcycle mirrors and directing light rearwardly. The Stahel device includes a shield adjacent the lights to prevent the lights from shining toward the rider. Also, the Stahel device is configured to mount between the mirror and its housing, which makes it unsuitable for directing light frontwardly or to the side.

The idea of incorporating lights with side view mirrors is also shown in U.S. Pat. Nos. 5,805,366 and 6,152,587, which disclose signal lights associated with the housing of side view mirrors of vehicles other than motorcycles.

Some have attempted to incorporate signal lights in articles of clothing or equipment worn by motorcycle riders. For example, U.S. Pat. Nos. 4,891,736; 6,406,168; and 6,686,837 disclose helmet mounted signal lights that variously include running lights, turn signals, and brake lights. Such devices have not gained widespread acceptance because of various problems. One such problem is that the rider is not stationary on the motorcycle, particularly when making a turn. As the rider moves, so do the lights. If the rider turns his head to look in the direction of the turn, then the visibility of the lights incorporated in the helmet changes. Another such problem is that these remote lights need power and control signals, which means the lights are powered either from a battery, which must be replaced or recharged, or from a cable connecting the device to the motorcycle, which often hinders the normal movements of the rider. In either case, the devices are often a nuisance to the rider.

BRIEF SUMMARY OF THE INVENTION

According to one embodiment of the present invention, a pair of light assemblies for providing signals at an elevated position on a motorcycle, including one or more of running lights, turn signals, and brake lights, is provided. One of the pair is adapted to be mounted on the right side of the motorcycle and the other is adapted to be mounted to the left side. In one embodiment, the pair of light assemblies are adapted to be used in addition to the existing lighting system on the vehicle.

Each light assembly includes a light bar with a lens and a lamp assembly. The light bar is attached to one end of a hollow stem and the electrical wiring from the lamp assembly passes through the stem. The stem has a length sufficient to raise the housing, with the lamp assembly, above the top of the motorcycle mirror attached to the handlebars. The elevated position of the light bar provides for enhanced visibility of the light by placing the lamp assembly closer to the eye level of observers.

The other end of the stem is attached to a mounting bracket that is adapted to attach to the handlebars of a motorcycle. In one embodiment, the bracket attaches to the handlebar tube, and in another embodiment, the bracket attaches to the mirror mounting assembly. The electrical wiring exits the stem and is connected to the electrical system of the motorcycle.

The lamp assembly includes a circuit board supporting a multitude of lamps which are powered and controlled by the electrical wiring. The light bar has an opening to the front, side, and rear into which the lens fits. The lamp assembly fits into the light bar such that the lamps project through the lens. The lamp assembly includes a set of lamps that emit amber light, which is projected through the lens in the forward, side, and rear directions. In one embodiment, the amber light is operated as a turn signal indicator visible from the front, side, and rear of the housing. In another embodiment, the amber light is operated as a running light that is illuminated when the motorcycle is operating. The lamp assembly includes a set of lamps that emit red light, which is projected through the lens in the rear direction. The lamps associated with the red light are electrically connected to the brake system of the motorcycle and illuminate when the brakes are operated.

In one embodiment, the lamps are light emitting diodes (LEDs). In other embodiments, the lamps are light emitting devices, for example, halogen or incandescent. The lamps have a defined projection pattern, or beam, such that the rear facing lamps project their illumination to the rear and avoid direct illumination of the motorcycle operator and passenger.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A pair of light assemblies, generally shown as 100 on the figures, for providing visual signals on a motorcycle is disclosed. The visual signals are provided at an elevated position, thereby enhancing the visibility of the signals and increasing the safety for the operator of the motorcycle.

Figure 1:
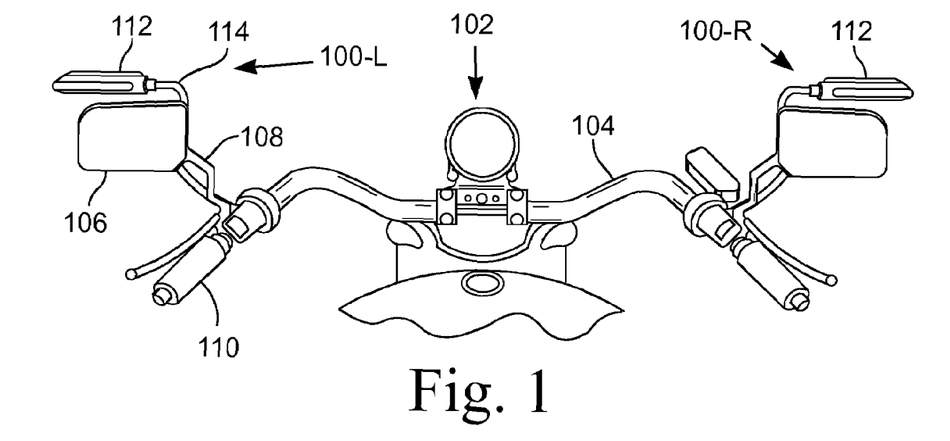
FIG. 1 is a partial rear view of a motorcycle showing the handlebars with the light assemblies.

FIG. 1 illustrates a partial rear view of a motorcycle 102 showing the handlebars 104 with a pair of the light assemblies 100. The handlebars 104 are used to steer and control the motorcycle 102. At each end of the handlebars 104 is a handgrip 110 and a side mirror 106. The handgrips 110 allow the operator to grasp the handlebars 104 for control and stability. Typically, the handgrip 110 on the right side of the handlebars 104 forms part of a throttle for controlling engine speed. Adjacent each handgrip 110 is a control lever (not shown) with the left lever on modern motorcycles 102 being a clutch lever and the right lever being a rear brake lever. The side mirrors 106 provide a rear view for the operator of the motorcycle 102. Typically, the side mirrors 106 are mounted above the handgrips 110 on a mirror stem 108.

The pair of light assemblies 100 are attached near the ends of the handlebars 104. One light assembly 100-L is attached on the left side and the other light assembly 100-R is attached on the right side of the handlebars 104. The light assembly 100-L on the left indicates a left turn signal when actuated, and the light assembly 100-R on the right indicates a right turn signal when actuated. Each light assembly 100 includes a light bar 112 supported by a stem 114. In the illustrated embodiment, the light bar 112 of each light assembly 100 is immediately above the adjacent side mirror 106.

Figure 2:
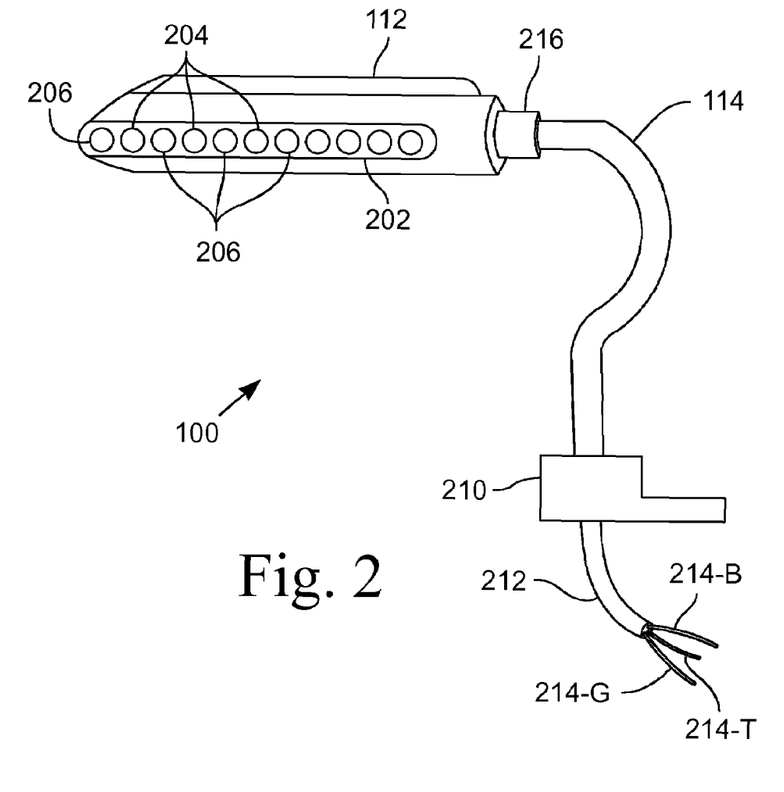
FIG. 2 is a rear plan view of one embodiment of a light assembly.

FIG. 2 illustrates a rear plan view of one embodiment of a light assembly 100. The light bar 112 includes a lens 202 wrapped around the front, side, and rear of the light bar 112. Attached to the light bar 112 is the stem 114 that supports the light bar 112. A fitting 216 attaches the stem 114 to the light bar 112 to secure the light bar 112 to the stem 114 when it is properly positioned on the motorcycle 102. The stem 114 is attached to a bracket 210 that attaches to the motorcycle 102. Extending from inside the stem 114 is a cable 212 containing electrical conductors 214-G, 214-T, 214-B for connecting to the electrical system of the motorcycle 102. In the illustrated embodiment, the electrical conductors 214 include a conductor 214-G for the ground connection, a conductor 214-T for the turn signal, and a conductor 214-B for the brake lights.

The lamps 204, 206 are of two types. A first set of lamps 204 emit a first color, such as red, to signal the brakes of the motorcycle 102 being actuated. The second set of lamps, or turn signal lamps, 206 emit a second color, such as amber, to provide a turn signal. In another embodiment, the second set of lamps, or brake lamps, 206 are also running lights, providing indication that the motorcycle 102 is in operation. In one such embodiment, the lamps 206 are illuminated with a lower intensity when operating as running lights than when operating as turn signals. The brake lamps, or brake lights, 206 are interspersed with the turn signal lamps 204 on the rear side of the light bar 112. The turn signal lamps, or turn signal lights, 204 are positioned at the side and front of the light bar 112.

In the illustrated embodiment, the lens 112 wraps around the light bar 112. In other embodiments, the lens 112 includes multiple sections, such as a front lens section, a side lens section, and a rear lens section. The lens 202 is a material that is transparent to the light emitted by the multitude of lamps 204, 206 inside the light bar 112. In one embodiment, the lens 202 is a clear plastic. In other embodiments the lens 202 has a coloration that permits the transmission of the color emitted by the lamp 204, 206 immediately behind the lens 202. For example, the front and side sections of the lens 202 is an amber color and the rear section of the lens 202 includes amber and red portions corresponding to the color being emitted by the lamp 204, 206 immediately adjacent to the lens 202 portion.

The stem 114 is a hollow tube that mates to the light bar 112 at one end and mates to the bracket 210 at the other end. In one embodiment, the fitting 216 is a nut that engages the threaded end of the stem 114 that is screwed into the light bar 112. The nut 216 is jammed against the light bar 112, thereby securing the stem 114 to the light bar 112. In another embodiment, the fitting 216 is a compression fitting that engages an opening in the light bar 112 and the fitting 216 receives the end of the stem 114 and locks the stem 114 in position relative to the light bar 112. In still another embodiment, the stem 114 is secured to the light bar 112 with a setscrew screwed into a threaded opening in the bottom of the light bar 112 and engaging the stem 114, which is inserted in a through-opening in the inboard end of the light bar 112.

The stem 114 has a shape suitable for mounting beside the mirror stem 108. In the illustrated embodiment, the light assembly 100 is adapted to have the bracket 210 attach at the same point that the mirror stem 108 attaches to the handlebars 104. The stem 114 is curved and bent to avoid contact with the mirror stem 114 while allowing the stem 114 to support the light bar 112 at a position above the mirror 106. In other embodiments, the stem 114 has a shape and configuration suitable for supporting the light bar 112 above the handlebars 104, for example an inverted L-shape.

Figure 5:
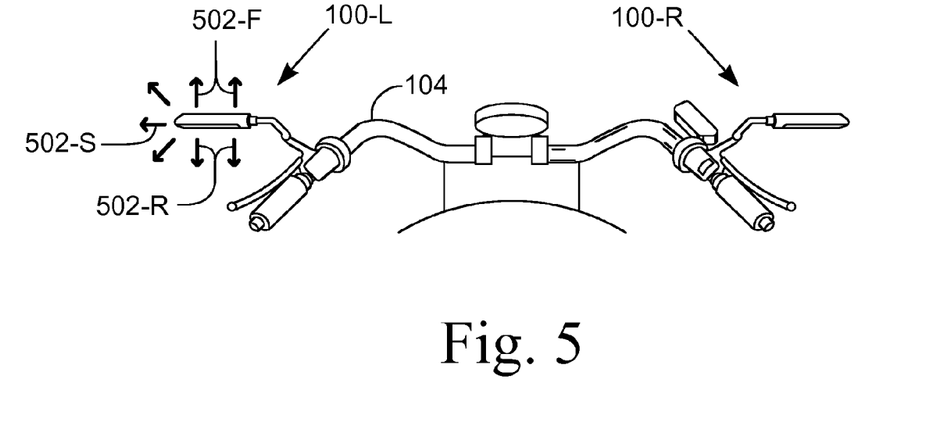
FIG. 5 is a partial top view of a motorcycle showing a pair of light assemblies with the turn signals illuminated.
Figure 6:
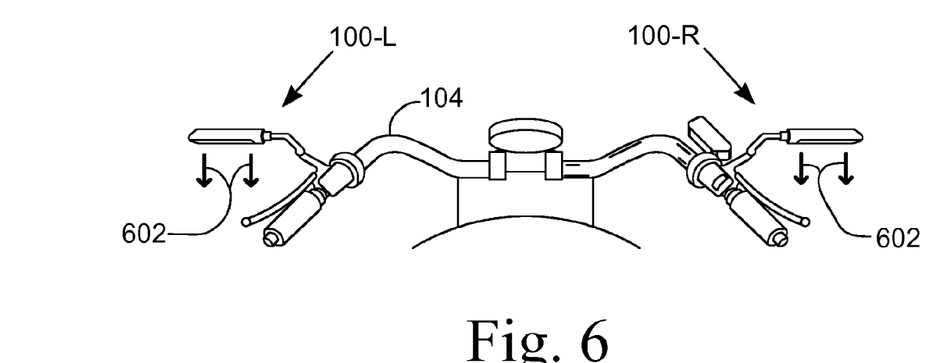
FIG. 6 is a partial top view of a motorcycle showing a pair of light assemblies with the brake lights illuminated.

The bracket 210 secures the stem 114 to the handlebars 104. FIGS. 5 and 6 illustrate two embodiments of such a bracket 210. In still another embodiment, the stem 114 attaches directly to a clamp attached to the handlebars 104.

Figure 3:
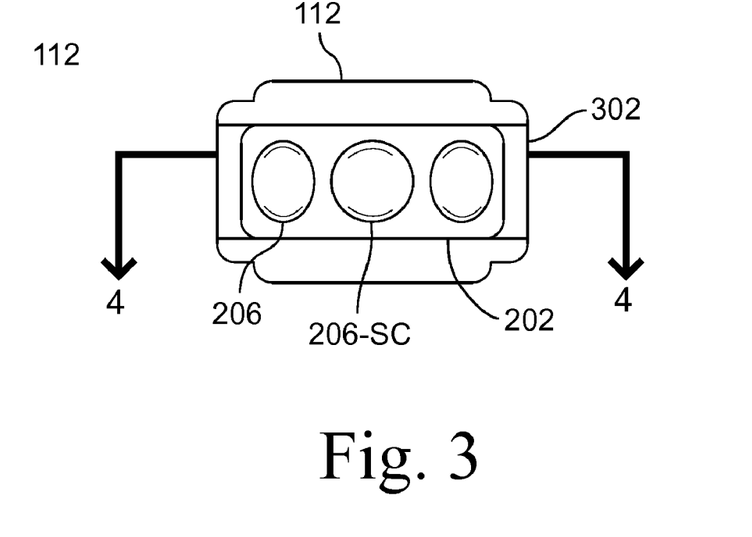
FIG. 3 is a side view of one embodiment of the light bar.

FIG. 3 illustrates a side view of one embodiment of the light bar 112. In the illustrated embodiment, the light bar 112 has a roughly rectangular shape with rounded edges as seen from the side. The light bar 112, in other embodiments, has other configurations for its outside surfaces. The lens 202 is set slightly inside a recess 302 in the light bar 112 and seals the light bar 112 to prevent water intrusion into the cavity inside the light bar 112. In various embodiments, the lens 202 has an outside surface that ranges from flat to convex. In still another embodiment, the lamps 204, 206 protrude through the light bar 112 without an interposing lens 202. In such an embodiment, the light bar 112 includes a sealant around the lamps 204, 206 to protect the light bar 112 from water intrusion.

Figure 4:
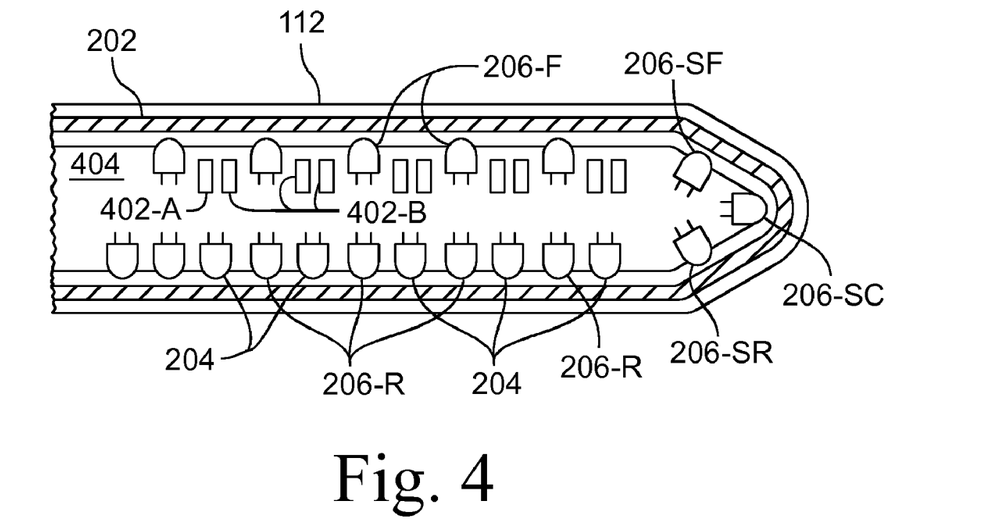
FIG. 4 is a partial cross-sectional view of one embodiment of a light bar.

FIG. 4 illustrates a partial cross-sectional view of one embodiment of a light bar 112 for the right light assembly 100-R. The light bar 112 has a cavity into which fits the lens 202 and an assembly including a circuit board 404 and a multitude of lamps 2040, 206. The lens 202 has a thin cross-section that surrounds the lamps 204, 206 inside the lap bar 112. In another embodiment, the lens 202 includes a dispersing configuration adjacent each lamp 204, 206. Behind the lens 202 and inside the light bar 112 are the brake lights 204 and the turn signal lights 206. The lamps 204, 206 are attached to a circuit board 404 that positions the lamps 204, 206 in a spaced relationship. The circuit board 404 is secured inside the light bar 112.

In one embodiment, the lamps 204, 206 are light emitting diodes (LEDs) and the circuit board 404 includes current limiting resistors 402. LEDs have an advantage of being solid state components that are immune to vibratory failure unlike incandescent lamps in which the filament is susceptible to failure from vibration. The immunity to vibration induced failure is particularly important to motorcycles 102 which are susceptible to high levels of vibration. In addition to road induced vibration, the engine of the motorcycle 102 contributes to the vibration of the motorcycle 102.

In the illustrated embodiment, there are six brake lamps 204 and thirteen turn signal lamps 206. Because there is an odd number of turn signal lamps 206, one resistor 402-A limits the current through one LED for the turn signal lamps 206 and the other resistors 402-B limit the current through two series connected LEDs for the brake lamps 204 and the remaining turn signal lamps 206. Having multiple resistors 402 ensures that in the event a resistor or LED fails, the light bar 112 will still function, but with fewer lamps 204, 206.

In the illustrated embodiment, the forward-facing and the rearward-facing lamps 204, 206-F, 206-R are aimed toward the front and the rear, respectively, of the light bar 112. The turn signal lamps 206 illuminate 180 degrees around the light bar 112. In one embodiment, the lamps 204, 206-R have a beam width of approximately 30 to 45 degrees. The lamps 204, 206 emit a beam of full intensity light in a conical pattern having a beam width specified in degrees. An observer outside the conical beam does not see the full intensity of the lamps 204, 206-R. The light bars 112 have a front side and a rear side. The eyes of the operator of the motorcycle 102 are typically positioned above the front seat of the motorcycle 102. A plane bisecting the front and rear sides and passing through the inboard and outboard ends of the light bars 112 is a horizontal plane. The beam of light emitted from the lamps 204, 206-R intersects the plane with the boundaries of the beam having an angular separation equal to the beam width. The light bars 112 are typically mounted just below the eye level of the operator of the motorcycle 102. Considering the distance the operator sits behind the center of the handlebars 104 and the distance from the center of the handlebars 104 to the light bars 112 mounted on the ends of the handlebars 104, the eyes of the typical operator of the motorcycle 102 will not fall within the beam emitted from the lamps 204, 206-R. The required beam width will necessarily vary depending upon the width of the handlebars 104 and the distance between the handlebars 104 and the operator position. In one embodiment, the rearward facing lamps 204, 206-R are positioned such that the axis of illumination of the light beam is aimed slightly outboard, rather than parallel to the front-to-rear axis of the motorcycle 102, such that the eyes of the operator do not fall within the beam, but the beam is still substantially rearwardly facing.

With the narrow beam width, the lamps 204, 206 provide a directional beam of illumination. The center side-facing lamp 206-SC has an axis of illumination directed perpendicular to the front-to-rear axis of the motorcycle 102. The adjacent side-facing lamps 206-SR, 206-SR have an axis of illumination directed between that of the center side-facing lamp 206-SC and the forward or rearward-facing lamps 206-F, 206-R. With this orientation, the turn signal lamps 206 provide 180 degree illumination from the front side to the rear side of the light bar 112.

FIG. 5 illustrates a partial top view of a motorcycle showing a pair of light assemblies 100 with the left turn signal lights 206 illuminated. The handlebars 104 are shown in a neutral position, that is, the handlebars 104 are positioned to direct the motorcycle 102 in a straight forward direction. In normal operation, only the left or the right turn signal lights 206 are illuminated at one time, unless the motorcycle 102 includes an emergency flasher feature in which all the turn signal lights 206 are illuminated simultaneously or the turn signal lamps 206 also provide running light illumination. The top view of the light assemblies 100 shows the light bars 112 oriented perpendicular to the direction of travel of the motorcycle 102.

The turn signal lights 206 illuminate 180 degrees around the light bar 112 and are visible to others in front of the motorcycle 102, to the side of the motorcycle 102, and to the rear of the motorcycle 102. The illumination 502 from the turn signal lamps 206 extends from a front illumination 502-F through a side illumination 502-S to a rear illumination 502-R.

Considering the distance the light bar 112 is from the centerline of the motorcycle 102 and the distance the operator is from the handlebars 104, the narrow beam width of the lights 206-R ensures that the rear illumination 502-R will not impinge upon the eyes of the operator of the motorcycle 102. That is, the operator may see some incident light from the lens 202 and the LED packaging with peripheral vision, but the direct light from the rearward-facing turn signal lights 206 is not visible to the operator. Accordingly, the turn signal lights 206-R are not distracting to the operator of the motorcycle 102.

FIG. 6 illustrates a partial top view of a motorcycle showing a pair of light assemblies 100 with the brake lights 204 illuminated. The brake lights 204 have illumination 602 directed to the rear of the motorcycle 102 with the illumination 602 visible to vehicles behind the motorcycle 102. As with the rear turn signal lights 206-R, the narrow beam width of the brake lights 204 ensures that the rear illumination 602 will not impinge upon the eyes of the operator of the motorcycle 102. Accordingly, the brake lights 204 are not distracting to the operator of the motorcycle 102.

Figure 7:
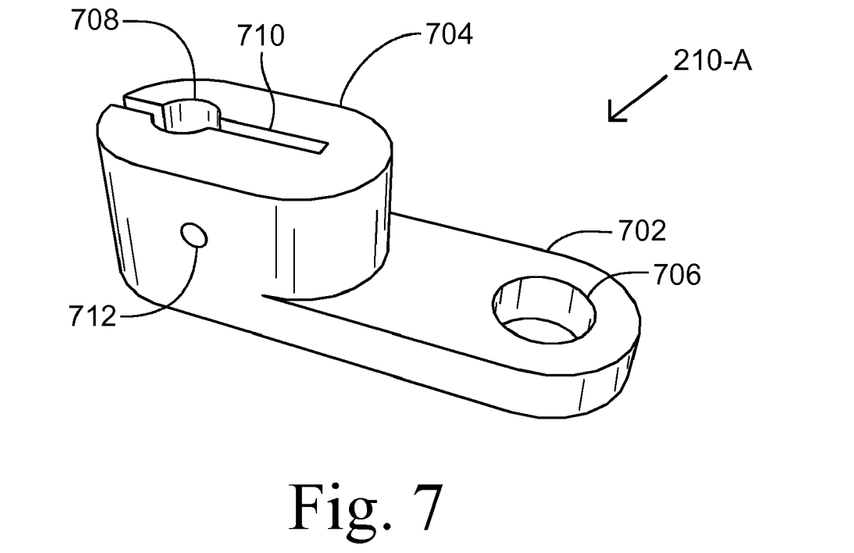
FIG. 7 is a perspective view of one embodiment of a bracket.

FIG. 7 illustrates a perspective view of one embodiment of a bracket 210-A. The bracket 210-A includes a base 702 with a stem clamp 704. In the illustrated embodiment, the base 702 includes a through-opening 706. In one such embodiment, the through-opening 706 receives the mirror stem 108 such that the base 702 is secured to the handlebars 104 by the mirror stem 108 attachment to the handlebars 104. Some mirror stems 108 have a threaded bottom that is screwed into a threaded opening in an attachment secured to the handlebars 104. A jam nut secures the mirror stem 108 when it is properly positioned. Some other mirror stems 108 have a threaded bottom below a flange. The threaded bottom passes through a hole and engages a nut, and the base 702 is clamped between the flange and the nut, thereby securing the mirror stem 108 to an attachment secured to the handlebars 104. In another embodiment, the base 702 is adapted to clamp to the handlebars 104. In various embodiments, the base 702 swivels about the through-opening 706 such that the stem 114, secured by the stem clamp 704, is positioned to avoid contact with the mirror stem 108.

The stem clamp 704 includes a through-opening 708 that receives the stem 114 attached to the light bar 112. The through-opening 708 is bisected by a slot 710. The stem clamp 704 has an opening 712 perpendicular to the slot 710 adjacent to the through-opening 708. The opening 712 is adapted to receive a fastener that draws the slot 710 together, thereby pinching, or clamping, the stem 108 in the through-opening 708. In one such embodiment, the opening 712 is a blind hole that is threaded at its bottom end past the slot 710. A threaded fastener is screwed into the opening 712 and engages the threaded bottom. In another such embodiment, the opening 712 is a through-opening and the fastener is a bolt that is fastened on the opposite side of the opening 712 from the bolt head.

Figure 8:
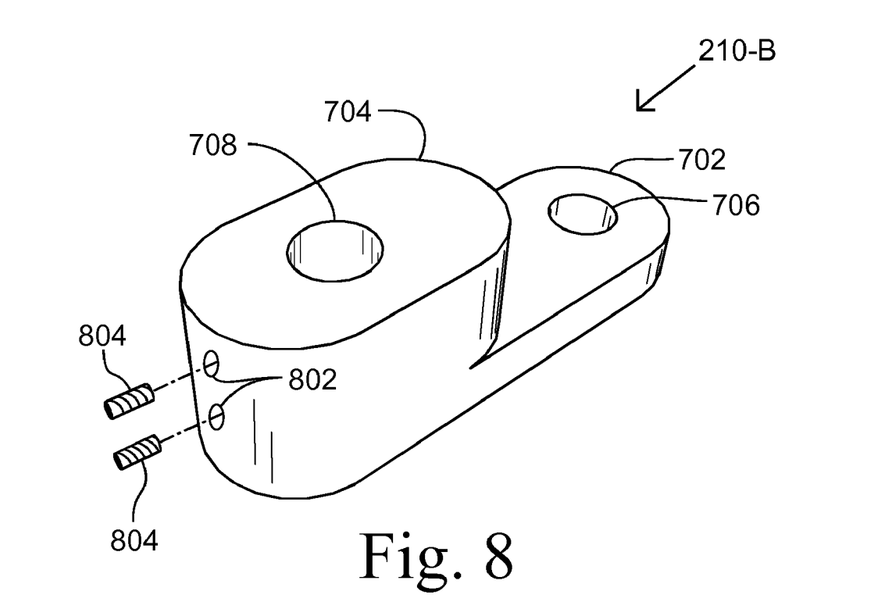
FIG. 8 is a perspective view of another embodiment of a bracket.

FIG. 8 illustrates a perspective view of another embodiment of a bracket 210-B. The bracket 210-B includes a base 702 with another embodiment of a stem clamp 704'. The base 702 of this embodiment of the bracket 210-B attaches to the handlebars 104 in a manner similar to that of the base 702 illustrated in FIG. 7.

The illustrated embodiment of the stem clamp 704' includes a through-opening 708 that receives the stem 114 attached to the light bar 112. The side of the stem clamp 704' includes two threaded openings 802 that penetrate to the through-opening 708. The threaded openings 802 receive setscrews 804 that are screwed into the threaded openings 802 until the setscrews 804 contact and bite into the sidewall of the stem 114, thereby securing the stem 114 in the through-opening 708. In one embodiment, the setscrews 804 have ends adapted to bite into the stem 114, such as cup-point or cone-point setscrews.

In the illustrated embodiment, the stem clamp 704' has a height sufficient to accommodate two setscrews 804 positioned axially with respect to the through-opening 708. In another embodiment, the two threaded openings 802 are positioned in a plane perpendicular to the longitudinal axis of the through-opening 708. To maximize the holding power of the setscrews 804, the threaded openings 802 have an approximate 60 degree displacement.

Figure 9:
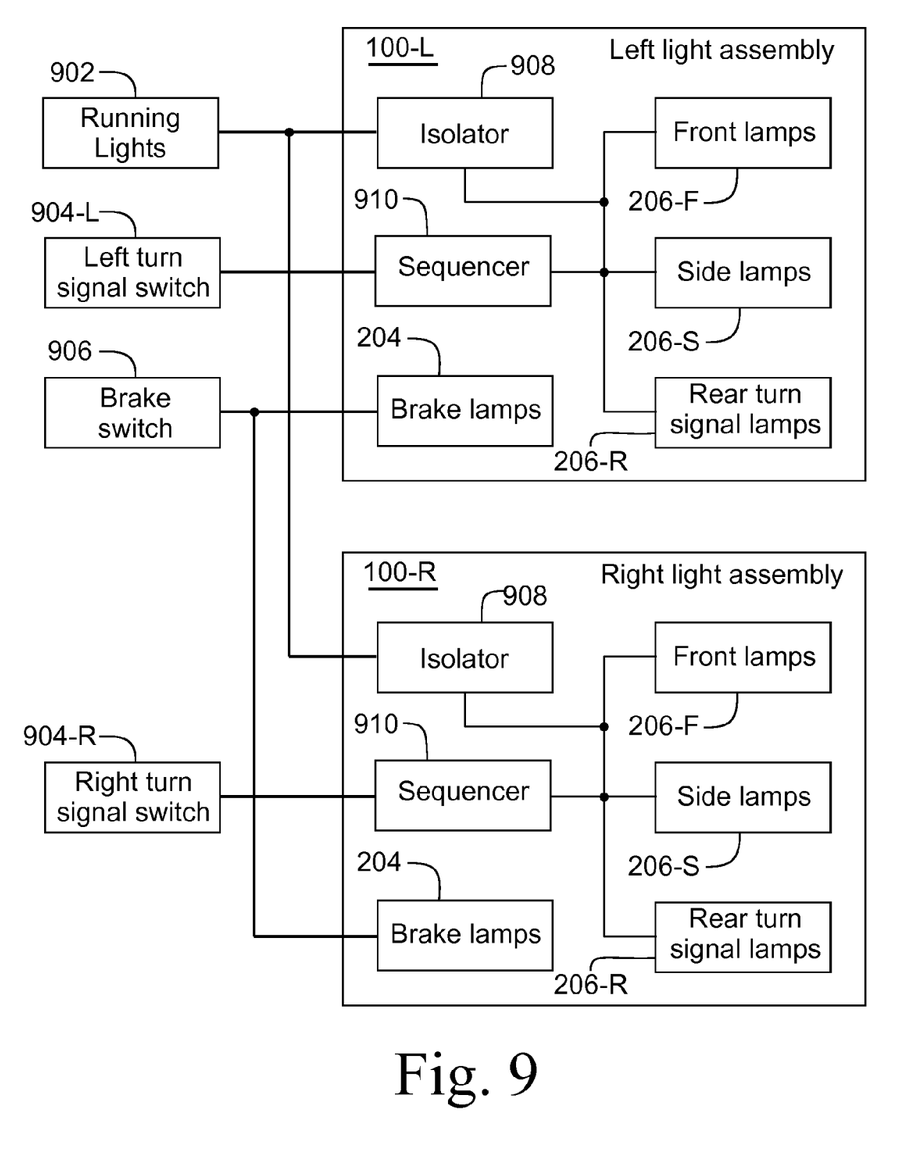
FIG. 9 is a block diagram of one embodiment of a lighting circuit.

FIG. 9 illustrates a block diagram of one embodiment of a lighting circuit for a pair of light assemblies 100. In various embodiments, the lighting circuit includes connections to the running lights 902, the left turn signal switch 904-L, the right turn signal switch 904-R, and the brake light switch 906, which are part of the wiring circuit of the motorcycle 102. The electrical configuration of the left light assembly 100-L is the same as that of the right light assembly 100-R. In one embodiment, the left and right light assemblies 100-L, 100-R are identical except for the mounting location on the handlebars 104.

In the illustrated embodiment, the running lights 902 for the motorcycle 102 are electrically connected to an isolator 908 in each light assembly 100. The isolator 908 prevents either of the turn signal switches 904 from feeding a signal to the other light assembly 100 and illuminating the turn signal lamps 206 in both light assemblies 100. In one embodiment, the isolator 908 includes a diode that provides isolation for the two sets of turn signal lamps 206. In another embodiment, the running lights 902 are not connected to the light assemblies 100. In such an embodiment, the isolator 908 is not necessary and the light assemblies 100 do not include the isolators 908.

The brake switch 906 is connected to the brake lamps 204 in both the left light assembly 100-L and the right light assembly 100-R. In one embodiment, the electrical connection between the brake switch 906 and the light assemblies 100 is made by the electrical conductor 214-B in the cable 212.

The left turn signal switch 904-L is connected to the left light assembly 100-L and the right turn signal switch 904-R is connected to the right light assembly 100-R. In one embodiment, the electrical connection between each turn signal switch 904 and the corresponding light assembly 100 is made by the electrical conductor 214-T in the cable 212.

In the illustrated embodiment, the turn signal switches 904 are each connected to a sequencer 910, which in turn is connected to the front, side, and rear turn signal lamps 206-F, 206-S, 206-R. The sequencer 910 is a device that sequentially illuminates the individual lamps 206 so as to point in the direction corresponding to the turn signal. In one such embodiment, the two lamps 206-F, 206R closest to the stem fitting 216 are illuminated with the other lamps 216 not being illuminated. After a short period, the adjacent lamps 206-F, 206R are illuminated, and after another short period, the lamps 206-F, 206R adjacent to the ones just illuminated are illuminated. This continues until the outermost lamp 206-SC is illuminated, at which time all the turn signal lamps 206 are illuminated. After a time interval, all the lamps 206 go dark and the process repeats. In this manner, the light bar 112 is observed to project light that progressively moves in the direction of the indicated turn signal. In another embodiment, the sequencer 910 switches the lamps 206 individually such that only one lamp 206-F on the front side and one lamp 206-R on the rear side is illuminated at a time. The singly illuminated lamp 206 appears to be a light moving in the direction indicated by the turn signal.

In another embodiment, the sequencer 910 is not in the circuit and each turn signal switch 904 actuates all the turn signal lamps 206 associated with the turn signal switch 904. In such an embodiment, each turn signal switch is directly connected to the turn signal lamps 206 in the corresponding light assembly 100. In such an embodiment, the sequencer 910 is not necessary and the light assemblies 100 do not include the sequencers 910.

The light assemblies 100 include various functions. The function of connecting each of the stems 114 to an outboard end of a set of handlebars 104 attached to the motorcycle 102 such that the light bars 112 are positioned above the mirror 106 is implemented, in one embodiment, by the bracket 210 having a stem clamp 704 for securing the stem 114 to the bracket 210 and a base 702 for securing the bracket to the handlebars 104. The stems 114 have a length and a configuration to position the light bars 112 above the mirrors 106. In another embodiment, the stems 114 are clamped to the handlebars 104 adjacent the mirrors 106 with the stems 114 having a length and a configuration to position the light bars 112 above the mirrors 106. The function of electrically connecting the light assemblies 100 to an electrical system of the motorcycle 102 is implemented, in one embodiment, by the cable 212 electrically connected to the circuit board 404 inside the light bar 112.

From the foregoing description, it will be recognized by those skilled in the art that a pair of light assemblies 100 for a motorcycle 102 have been provided. The light assemblies 100 provide signal lights, such as turn signals and brake lights, for a motorcycle 102 with the assemblies 100 providing increased visibility by their elevated position on the motorcycle 102, which is above the side view mirrors 106. The elevated position is close to the line of vision of operators of other vehicles, including automobiles and motorcycles. The closer the signal lights are to the normal line of vision of others, the more likely the signal lights will be seen and recognized by others. Additionally, the light assemblies 100 are positioned near the extremities of the handlebars and use narrow beam lamps 204, 206. The operator of the motorcycle 102 is not likely to be distracted by the signal lights because the operator's eyes are positioned outside the light beam emitted by the lamps 204, 206. Additionally, the location of the light assemblies 100 at the widest part of the motorcycle 102 aids in separating the illumination 502 for more ready recognition of the signals by others.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for providing visual signals at an elevated position on a motorcycle, said apparatus comprising:
   a set of handlebars attached to the motorcycle;
   a left mirror positioned on a left side of said handlebars, said left mirror attached to a mirror stem with a first end and a second end, said first end attached to said left mirror, said second end attached to said handlebars;
   a left light assembly adjacent said left mirror, said left light assembly including
      a left light bar positioned above said left mirror, said left light bar having a plurality of turn signal lamps positioned to direct light to a front side, an outboard side, and a rear side of said left light bar, said plurality of turn signal lamps each being a light emitting diode, said left light bar having a plurality of brake lamps positioned to direct light to a rear side of said left light bar, said plurality of brake lamps each being a light emitting diode,
      a left stem attached to an inboard end of said left light bar,
      a left bracket having a base and a stem clamp, said stem clamp securing said stem to said left bracket, said base having a through-opening receiving said second end of said mirror stem of said left mirror, said mirror stem securing said left bracket to said handlebars;
   a right mirror positioned on a right side of said handlebars, said right mirror attached to a mirror stem with a first end and a second end, said first end attached to said right mirror, said second end attached to said handlebars; and
   a right light assembly adjacent said right mirror, said right light assembly including
      a right light bar positioned above said right mirror, said right light bar having a plurality of turn signal lamps positioned to direct light to a front side, an outboard side, and a rear side of said right light bar, said plurality of turn signal lamps each being a light emitting diode, said right light bar having a plurality of brake lamps positioned to direct light to a rear side of said right light bar, said plurality of brake lamps each being a light emitting diode,
      a right stem attached to an inboard end of said right light bar,
      a right bracket having a base and a stem clamp, said stem clamp securing said stem to said bracket, said base having a through-opening receiving said second end of said mirror stem of said right mirror, said mirror stem securing said right bracket to said handlebars; and
   a means for electrically connecting said left light assembly and said right light assembly to an electrical system of the motorcycle.

2. The apparatus of claim 1 wherein said left light bar and said right light bar each further includes a lens connecting a cavity to said front side, said outboard side, and said rear side.

3. The apparatus of claim 1 wherein said left light bar and said right light bar each further includes a front lens, a rear lens, and an outboard end lens.

4. The apparatus of claim 1 wherein said plurality of turn signal lamps and said plurality of brake lamps in said left light bar and said right light bar have a light beam with a narrow width such that said light beam does not cross the volume of space above a seat of the motorcycle.

5. The apparatus of claim 1 further including a sequencer connected to said plurality of turn signal lamps whereby said plurality of turn signal lamps sequentially illuminate in a direction moving from said inboard end to said outboard end of said light bar.

6. An apparatus for providing visual signals at an elevated position on a motorcycle, said apparatus comprising:
   a light bar having a cavity inside an inboard end, and outboard end, a front side, and a rear side, said light bar being oblong with said inboard end separated from said outboard end a distance further than said front side is separated from said rear side;
   a stem having a first end and a second end, said first end attached to said inboard end of said light bar, said stem being hollow;
   a bracket attached to said second end of said stem, said bracket adapted to be attached near an outboard end of a set of handlebars attached to the motorcycle, said stem having a length sufficient to position said light bar above a mirror attached to said handlebar; and
   a lamp assembly positioned in said cavity of said light bar, said lamp assembly including
      a plurality of turn signal lamps directing illumination in a forward direction, a rearward direction, and an outward direction;
      a plurality of brake lamps directing illumination in said rearward direction; and
      a plurality of electrical conductors electrically attached to said lamp assembly, said plurality of electrical conductors passing through a through-opening in said inboard end of said light bar and through said stem whereby said plurality of turn signal lamps and said plurality of brake lamps are adapted to be electrically connected to a wiring system of the motorcycle through said plurality of electrical conductors.

7. The apparatus of claim 6 wherein said light bar further includes a lens connecting said cavity to said front side, said rear side, and said outboard end.

8. The apparatus of claim 6 wherein said light bar further includes a front lens, a rear lens, and an outboard end lens, and said rear lens positioned adjacent said plurality of brake lamps.

9. The apparatus of claim 6 wherein each of said plurality of turn signal lamps directing illumination in said rearward direction and said plurality of brake lamps have a light beam with a narrow width such that said beam does not intersect a normal location of an operator of the motorcycle when said handlebars are in a neutral position.

10. The apparatus of claim 9 wherein said narrow width of said light beam is less than 45 degrees as measured in a plane bisecting said front side and said rear side of said light bar, said plane passing through said inboard end and said outboard end of said light bar.

11. The apparatus of claim 6 further including a sequencer connected to said plurality of turn signal lamps whereby said plurality of turn signal lamps sequentially illuminate in a direction moving from said inboard end to said outboard end of said light bar.

12. The apparatus of claim 6 further including an isolator electrically connected to said plurality of said turn signal lamps, said isolator adapted to be electrically connected to a wiring system of the motorcycle whereby said plurality of turn signal lamps are illuminated as a set of running lamps.

13. The apparatus of claim 6 wherein said bracket includes a stem clamp and a base, said base having a through-opening adapted to receive a mirror shaft; said base adapted to be secured to said handlebars by said mirror shaft.

14. An apparatus for providing visual signals at an elevated position on a motorcycle, said apparatus comprising:
  a pair of light bars including a left light bar for providing a left turn signal and a right light bar for providing a right turn signal, each of said pair of light bars having a cavity, an inboard end, an outboard end, a front side, and a rear side, each of said pair of light bars including a lamp assembly positioned in said cavity of each of said pair of light bars, said lamp assembly including
    a plurality of turn signal lamps in said cavity positioned to direct illumination through said lens in a forward direction, a rearward direction, and an outward direction;
    a plurality of brake lamps in said cavity positioned to direct illumination through said lens in said rearward direction; and
    a plurality of electrical conductors electrically attached to said lamp assembly, said plurality of electrical conductors passing through a through-opening in said inboard end of each of said pair of light bars, said plurality of turn signal lamps and said plurality of brake lamps adapted to be electrically connected to a wiring system of the motorcycle through said plurality of electrical conductors;
  a pair of stems each having a first end and a second end, said first end attached to said inboard end of an associated one of said pair of light bars, each one of said pair of stems being hollow, a portion of said plurality of electrical conductors inside an associated one of said pair of stems; and
  a means for connecting each of said pair of stems to an outboard end of a set of handlebars attached to the motorcycle such that each one of said pair of light bars is positioned above a mirror attached to said handlebars.

15. The apparatus of claim 14 wherein said means for connecting includes a pair of brackets each attached to said second end of an associated one of said pair of stems, each of said pair of brackets adapted to be attached near an outboard end of a handlebars attached to the motorcycle, each of said pair of stems having a length sufficient to position each one of said pair of light bars above a mirror attached to said handlebars.

16. The apparatus of claim 14 wherein said light bar further includes a front lens, a rear lens, and an outboard end lens, each said lens positioned adjacent at least on of said plurality of turn signal lamps, and said rear lens positioned adjacent said plurality of brake lamps.

17. The apparatus of claim 14 wherein said light bar further includes a lens connecting said cavity to said front side, said rear side, and said outboard end.

18. The apparatus of claim 14 wherein said plurality of turn signal lamps and said plurality of brake lamps have a light beam with a narrow width such that said beam does not intersect a location of an operator of the motorcycle when said handlebars are in a neutral position.

19. The apparatus of claim 18 wherein said narrow width of said light beam is less than 45 degrees as measured in a plane bisecting said front side and said rear side of said light bar, said plane passing through said inboard end and said outboard end of said light bar.

20. The apparatus of claim 14 further including a sequencer connected to said plurality of turn signal lamps whereby said sequencer controls said plurality of turn signal lamps to sequentially illuminate in a direction moving from said inboard end to said outboard end.

* * * * *